Oct. 7, 1969   A. T. VAN HUISEN   3,470,943
GEOTHERMAL EXCHANGE SYSTEM
Filed April 21, 1967   3 Sheets-Sheet 3

INVENTOR.
ALLEN T. VAN HUISEN
BY
FOWLER, KNOBBE
& MARTENS
    ATTORNEYS.

United States Patent Office 3,470,943
Patented Oct. 7, 1969

3,470,943
GEOTHERMAL EXCHANGE SYSTEM
Allen T. Van Huisen, Orange, Calif.
(11622 Martha Ann Drive, Los Alamitos, Calif. 90720)
Continuation-in-part of application Ser. No. 566,186,
July 18, 1966. This application Apr. 21, 1967, Ser.
No. 632,782
Int. Cl. F28d *21/00;* F24j *3/04;* A01g *13/06*
U.S. Cl. 165—45                                2 Claims

ABSTRACT OF THE DISCLOSURE

The following disclosure relates to a system for the recovery and utilization of geothermal energy by delivering liquid to a heat exchanger at least partially submerged within a subsurface geothermal zone, conveying the heated liquid and/or vapor to the surface and utilizing the energy in the liquid or vapor for driving engines, turbines or for heat irrigation of cultivated soil.

---

The present application is a continuation-in-part of my application S.N. 566,186 filed in the U.S. Patent Office on July 18, 1966 and now abandoned.

BACKGROUND OF THE INVENTION

Field of the invention

The present invention relates to the utilization of geothermal energy without necessarily removing geothermal steam or geothermal fluid from the subsurface zones.

DESCRIPTION OF THE PRIOR ART

The present direct thermal fluid mining methods require that for economical recovery of geothermal energy, the geothermal heat must be contained in a mobile carrier such as a gas or liquid. If gas, there must be sufficient pressure to allow sustained production from the well and the gas must contain sufficient energy to drive a prime mover steam engine. If contained in an aqueous hot brine, the temperature must be sufficiently high to permit flashing of the water into steam, which after separation can drive a steam engine. The remaining brine must be economically convertible into useable commercial salts, the separated steam must not contain an undue amount of corrosive salts or gas such as, ammonia or hydrogen sulfide and the waste water and brines must be disposable without polluting surface or potable waters or cooling the subsurface source of heat or diluting the subsurface brine. Furthermore, cavitation, abrasion, scaling and corrosion of the equipment must not occur over too short an interval.

Geological prospecting techniques are not very accurate and drilling costs are high. When a dry well is drilled, it represents a complete loss of the prospecting and drilling costs. Moreover, drilling of adjacent wells entails a risk of lowering the bottom hole pressure of the whole field.

BRIEF SUMMARY OF THE INVENTION

In contrast, the present invention is not at all dependent on the delivery to the surface of geothermal steam or hot water. Rather, the present invention relies on the information of steam or hot liquid at the site of the geothermal deposit, and this pure hot liquid, or steam, is delivered to the surface for utilization. In one of its aspects, the present inventive system for the utilization of geothermal energy comprises a heat exchanger at least partially submerged within the geothermal strata; means for communicating heat exchange fluid to the heat exchanger and means for removing the heated fluid therefrom. In a preferred embodiment of the invention the system is a completely enclosed fluid circuit whereby the clean steam removed from the ground is utilized to drive a prime mover such as a reciprocating steam engine or a rotary turbine and then the low pressure steam is condensed and returned to the inlet of the pump that returns the water to the underground heat exchanger. In other aspects of the invention, the high energy steam removed from the subsurface heat exchanger is also used to drive the pump engine and to distill impure feedwater which is condensed before it enters the closed water circuit of the system.

The geothermal indirect steam producing system of the invention is peculiarly adaptable to a novel method of heat irrigation of cultivated land, whereby vast acreage can be raised in temperature to enhance growing of produce and to prevent frost damage and freezing of the ground in many areas of the world.

The advantages of the system, as compared to the open steam mining of the prior art, are apparent. Both prospecting and mining become less speculative and entail less risk since even if no geothermal water is found associated with the hot layer, that is a dry well is produced, energy removal is still possible according to the invention. Furthermore, multiple wells can be drilled very close together since there is no danger of exhaustion or reduction of the bottom hole steam pressure. Moreover, the energy exchange is much more efficient and thus, energy is conserved as compared to the lower efficiency that is obtained on flashing of geothermal water. Brine caused corrosion, abrasion, cavitation and disposal problems are all substantially reduced since the underground steam or water is not necessarily brought to the surface nor is the geothermal steam in direct contact with the equipment. There are no disposal problems to be considered nor does the economics of manufacture of by-product minerals have to enter into the total feasibility of the well or of the field of wells to be drilled.

BRIEF DESCRIPTION OF THE DRAWINGS

These and many other attendant advantages of the inventive system in process will readily be appreciated as they become better understood by reference to the following detailed description when considered in connection with the accompanying drawings in which:

Referring now to FIG. 2, the system of this embodiment includes a well 1 extending from the surface of the earth 2 down through the upper earth formation 3 of the earth's crust into a geothermal heat formation 4. The sides of the well 1 are covered with a metal casing 5 which is surrounded by an outer cement exterior layer 6. The bottom of the well is plugged by suitable means such as a metal-rubber plug 7 and cement layer 16. Disposed within the casing at the level of the geothermal heat formation 4 is a U-shaped boiler 8 which is split at the top of each leg, by inverted Y joints 10 into a plurality of U-shape tubes 11 providing increased heat contact area to the fluid contained within the tubes 11. The bottommost area of the casing containing the boiler may be filled with a secondary heat conducting substance. A fluid 17 may surround the tubes such as liquid mercury held under pressure by a cap having an inlet port 18 and pressure release valve 19; or the interior portion of the casing surrounding the boiler may be filled with a solid such as sand or cement.

Figure 1:
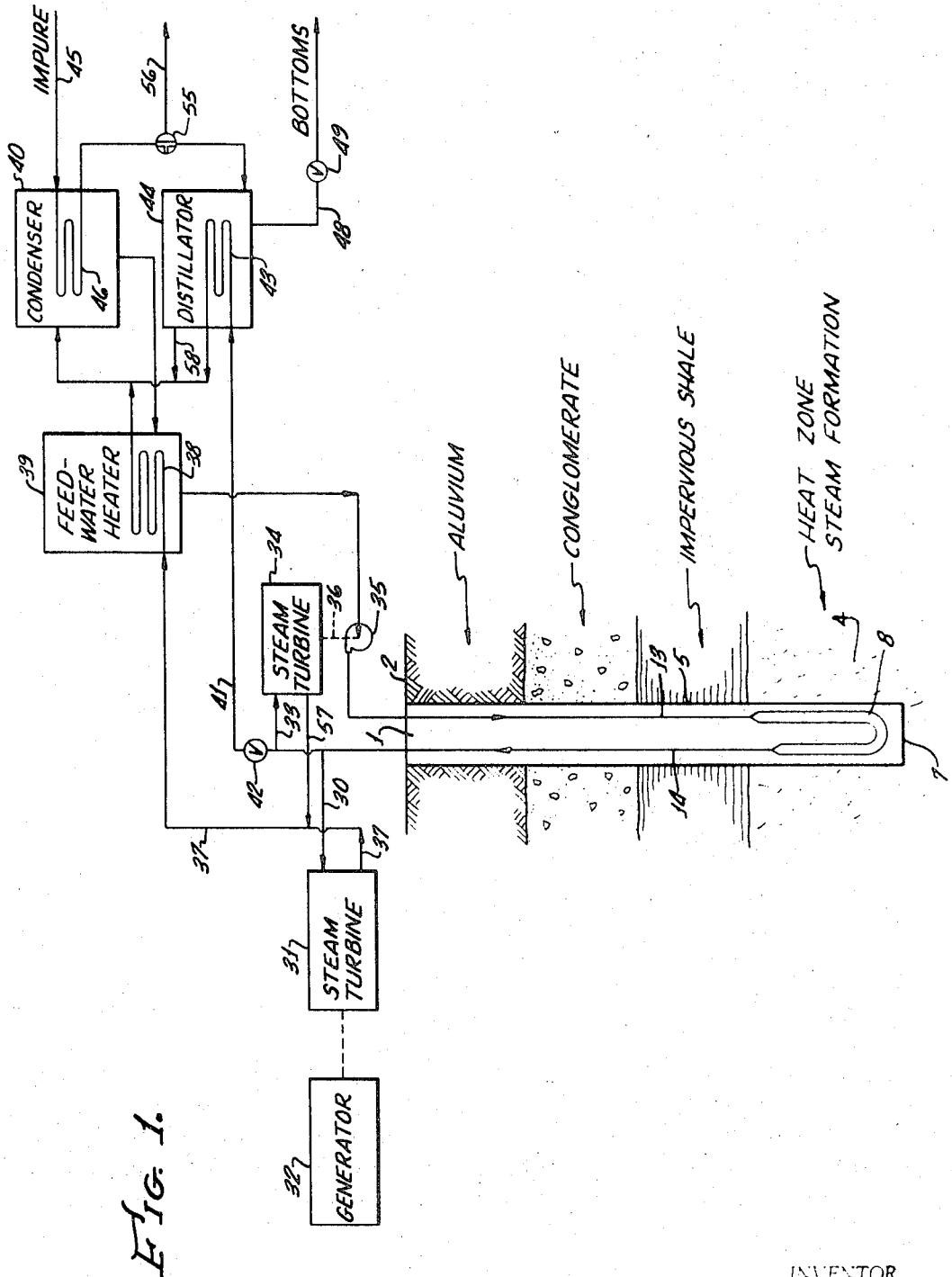
FIG. 1 is a schematic view illustrating a first preferred embodiment of the geothermal electrical generation system of the invention in which the water flows in a closed circuit and the steam produced is utilized to power the pump and distillation column.
Figure 2:
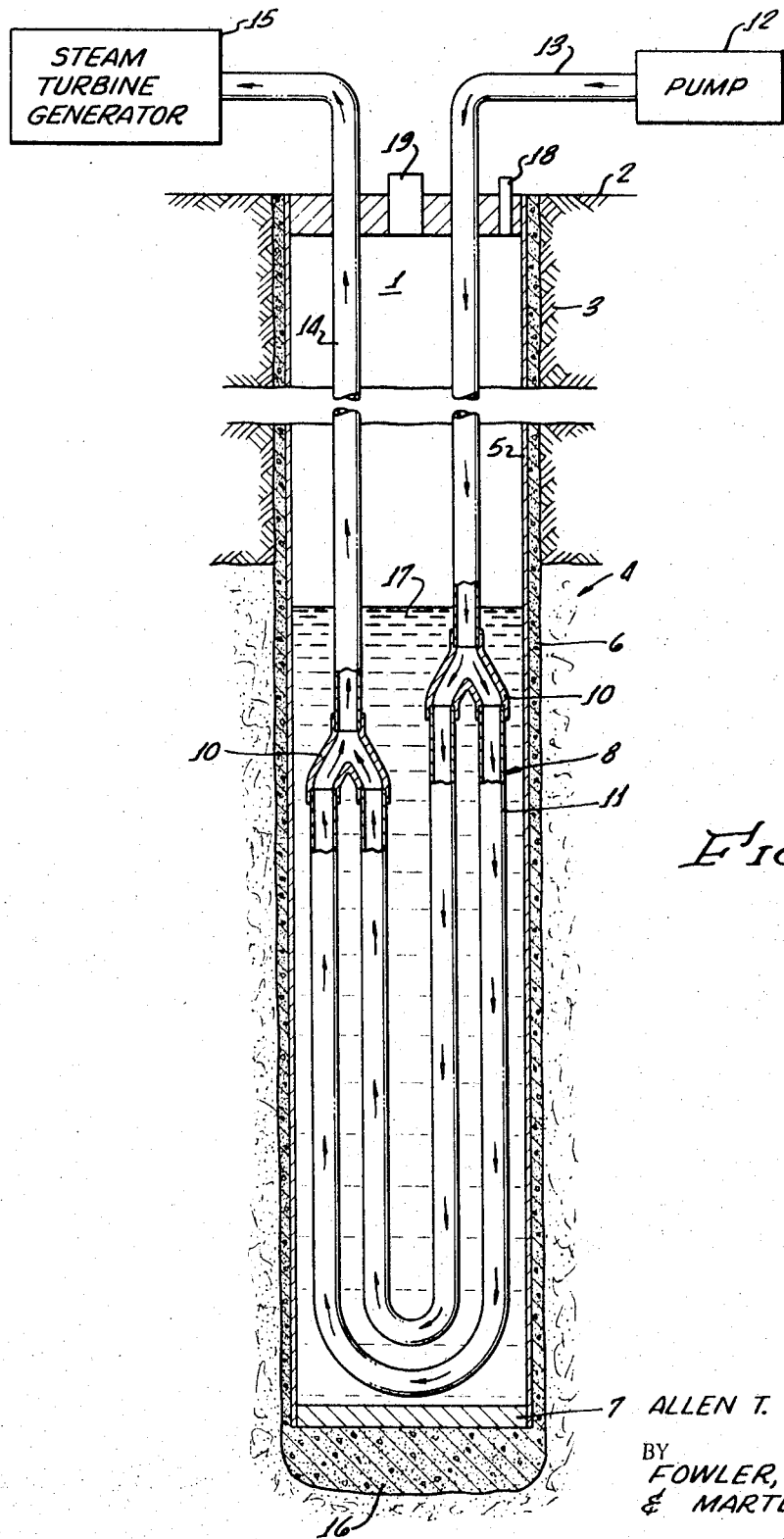
FIG. 2 is an enlarged schematic view partly in section of a geothermal energy utilization system of the invention showing a simplified pump and turbine-generator and illustrating the details of one form of heat exchanger and of a well casing.

Boiler feedwater from a source (not shown) is delivered under pressure by means of pump 12 through inlet conduit 13 and one Y joint 10 into the boiler tubes 11; and after partially flowing through the tubes; the heat conducted from the formation through the cement and casing into the interior of the casing will heat the pipes and the water will be converted into saturated and then superheated steam which will flow out of the other Y joint 10 and exhaust conduit 14 to a steam turbine generator 15 for utilization.

FIG. 1 illustrates the preferred closed system with auxiliary equipment such as the pump and distillation column being energized by the steam exhausted from the underground boiler. The system of FIG. 1 also includes a well 1 extending from the surface 2 through the various surface strata as labeled, into a geothermal zone which, in this case, is a steam zone 4 fed by magmatic or meteoric waters to form geothermal steam. The exterior of the well is again surrounded by a casing 5. A U-shaped steam boiler 8 is disposed inside the casing 5 at a depth at least partially entering the geothermal steam strata. Boiler feed grade water flows to the boiler 8 through water or inlet conduit 13 and leaves the boiler through steam exhaust conduit 14.

The generated steam flows into branch conduit 30 and drives steam turbine 31 and generator 32 and into branch conduit 33 to drive steam turbine 34 the prime mover for boiler feed pump 35. The condensate from turbine 34 is returned to the intake side of pump 35 through tubing 36 while the exhaust steam leaves through pipe 57. The exhaust steam from turbine 31 leaves through pipe 37; is joined by the exhaust steam in pipe 57 and flows through the coils 38 of the feedwater heater 39 before entering condenser 40. The remainder of the generated steam enters branch pipe 41 by opening valve 42 and this steam powers the coils 43 of distillation column 44.

Referring now to the feedwater circuit, impure feedwater enters inlet pipe 45 and first flows through the coils 46 of condenser 40 before entering distillation column 44. The vapors from the distillation column 44 are removed through pipe 58 and join the exhaust steam leaving the coils 43 of the distillation column 44 and the exhaust steam leaving the coils 38 of the heater 39. This combined stream of pure steam is delivered to condenser 40. The condensate flows to the feedwater heater tank 39 and the heated pure boiler feedwater then flows to the inlet side of pump 35.

To prevent salt buildup, the bottoms from the distillation column 44 are periodically or continuously removed through bleed conduit 48 by opening valve 49.

Figure 3:
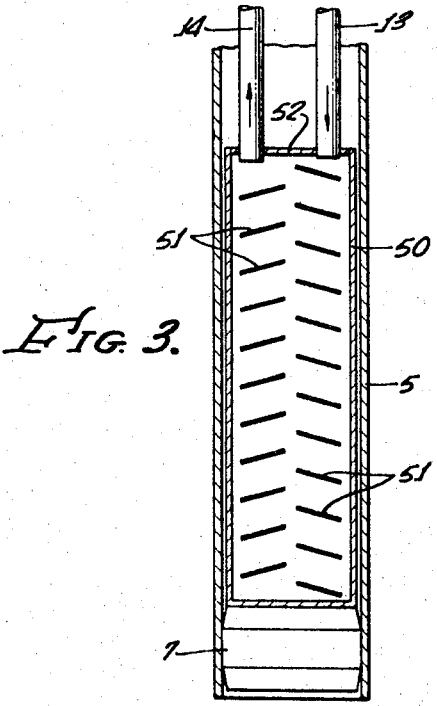
FIG. 3 is a cross sectional view of another form of heat exchanger.

In the embodiment of FIG. 3, the heat exchanger is in the form of a closed cylinder 50 in sliding engagement with casing 5 and the exchanger is positioned at least partially within the goeothermal zone and can rest on the bottom plug 7 of the well. The heat exchanger contains internally supported baffles 51 and water inlet pipe 13 and steam exhaust pipe 14 are attached to the top plate 52. Heat is directly conducted to the walls of the exchanger by the walls of the casing. The exchanger is removable for maintenance by raising it from the well by upward lifting of the pipes 13 and 14.

Figure 4:
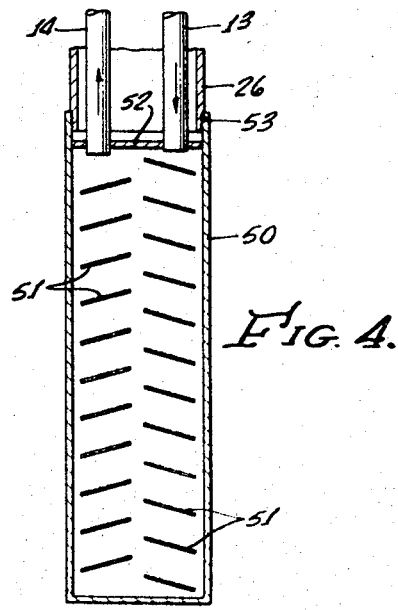
FIG. 4 is a cross sectional view of a further heat exchanger forming a part of the well casing.

In the embodiment of FIG. 4, the heat exchanger 50 itself forms the bottom portion of the well casing. The next section 26 of the casing 5 is attached directly to the exchanger at 53. In such a construction, the heat exchanger is permanently installed.

To initiate operation, a quantity of boiler grade feedwater is pumped into the heat exchanger 8. Heat is transferred by the steam impinging against the concrete casing and is conducted by the metal casing to the water contained in the exchanger. The water is vaporized after partially traversing the length of the excahnger and is superheated by the time of its exit. The major portion superheated steam leaving through conduit 14 is used to drive the steam turbine 31 coupled to the electrical generator 32. A portion of the generated steam takes over the function of driving the pump 35.

A flow of cold impure feedwater is at this time initiated through the condenser coils 46 and into distillation column 44 covering steam coils 43. The exhaust steam from the two turbine engines is delivered to the feedwater heater coils 38 and joins the exhaust steam from the distillation coils 43 before entering the body of the condenser 40. Auxiliary generated steam fed to the distillation coils vaporizes the impure feedwater and the vapor fed to the condenser joins the exhaust steam from the turbines and the steam coils 43 and the condensate flows into the return side of the circuit through the water heater 39 into the inlet side of the pump 35. If additional feedwater is not needed, valve 55 is closed and the condenser water will leave through the outlet pipe 56.

With respect to the drilling of a well, geological prospecting procedures presently can only locate gross deposits which are usually near areas which have experienced recent volcanic activity. The drilling techniques employed closely follow those utilized in the petroleum industry with one important exception. After the well has been drilled to a depth at which the desired heat flow is obtained, the well casing is positioned in place and cement is forced into the annular space between the casing and the earthen sides of the well. Then, contrary to usual mining practice, the bottom of the well is capped before the heat resource is removed from the strata and is maintained capped during mining and production of the resource. Capping of the bottom can be effected by forcing a plug 7 to the bottom of the casing 5 by means of water pressure.

The boiler is then lowered and fixed in position within the well with the intake and exhaust conduits affixed. Pure boiler feedwater is then pumped into the boiler under pressure and the steam is exhausted and delivered to sites of utilization. The boiler feedwaters are those suitable for prior art turbine installations and usually contain less than about five parts per million of impurities preferably one to three parts per million. The temperature and dryness of the steam produced depends on the temperature of the geological formation which usually is from about 400° F. to 1,000° F., and also is dependent on the rate of flow of water and the size and heat exchange surface of the heat exchanger or boiler. The depth of the well depends on the location of the magmatic or geothermal deposit with respect to the surface of the earth. In some areas these deposits can be very close to the surface of the earth and in other areas these may be thousands of feet below the surface of the earth. The temperature of the subsurface increases with depth and temperature increases of one degree C for each 100 feet of penetration are found in the upper layers. Within magmatic layers temperature is believed to increase also with depth, but within geothermal steam zones, constant temperatures can be expected. It is purely a matter of economics how far one wishes to dig in view of the increased temperature that can be obtained.

Figure 5:
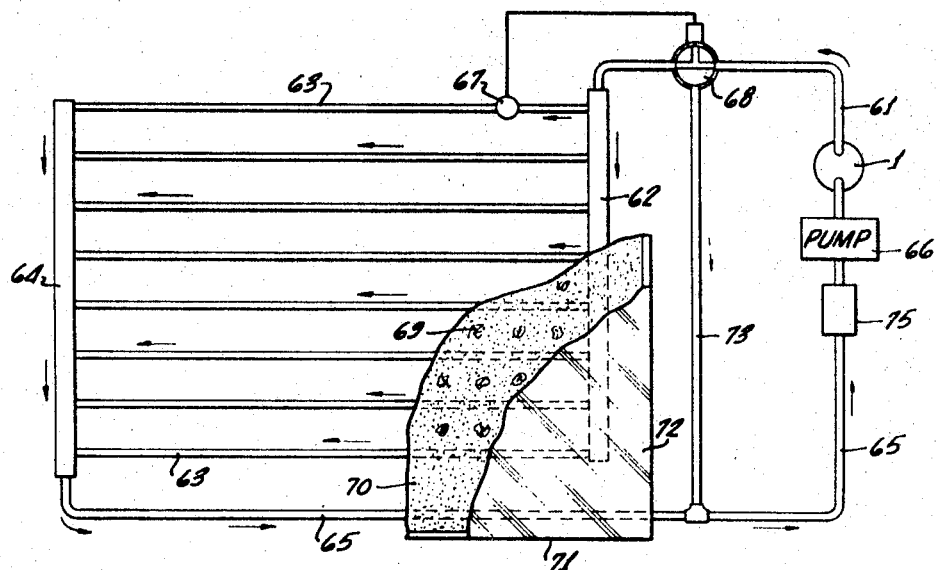
FIG. 5 is a schematic view of a heat irrigation system according to the invention.

FIGS. 1 to 4 illustrate the conversion of the geothermal heat energy into steam energy which has then been used to drive mechanical steam engines which in turn drive pumps or electrical generators to produce electrical energy. With reference to FIG. 5, there is shown an embodiment wherein the geothermal produced steam is used directly to heat the surface of the earth as a means of heat irrigation. In the heat irrigation system according to the invention a geothermal steam producing well 1 can be located near agriculture acreage and the steam exhausted from the subterranean boiler is fed to a series of steam pipes submerged in the ground 70 either underneath or within the root systems of the plants 69 being cultivated. The generated steam flows from exhaust conduit 61 into a header 62 and is distributed into each of a series of steam heating pipes 63 submerged in the ground. The wet steam and condensate is collected in an exhaust header 64 and is returned by pipe 65 to the condenser 75 and then to the intake of the pump 66 of the steam producing system at the well. The ground can be maintained at a selected temperature by means of thermostat 67 controlling inlet valve 68 which either delivers the steam to the header 62 or bypasses it back to the well 1 through bypass conduit 73 and return conduit 65. If it is desired to prevent freezing of the ground, the pipes are installed somewhere within the first two feet which is the usual frost line. In unusually cold climates, such as the northwest or Alaska, it is also necessary to raise the temperature of atmosphere adjacent the ground and, therefore, the cultivated acreage can be insulated from the extreme cold by being enclosed in low-slung greenhouses 71. These greenhouses may contain transparent roof panels 72 to allow passage of sunlight to aid in the photo synthesis growth of the plants.

In the preceding paragraph where reference is made to the distribution of the steam through a system of pipes submerged in the ground for agricultural purposes, it should be understood that the system is quite effective even if heated fluid below steam temperature is employed. In fact, in many operations it will be preferable that the fluid ducted through the pipes in the cultivated soil be below steam temperature in that such may be harmful to the crop root system if the pipes are closely positioned to the root system. The desired temperature of the fluid will be determined by such factors as the heat transfer rate, the location of the pipes with respect to the plant roots, and the characteristics of the plants. The temperature of the fluid may be regulated by various ways, such as by controlling the depth of the well and the location of the heat exchanger.

The possibilities of utilization of the steam are infinite and grandiose schemes are envisioned such as the pumping of water from northern California to southern California over the Tehachapis by the use of energy derived from geothermal sources. The obvious desirability in the use of geothermal steam is apparent since the fossil fuel resources are extremely limited and can be exhausted within a few hundred years at the present rate of production. Furthermore, the use of geothermal steam according to the invention does not produce by-products of combustion such as in the burning of coal, oil and gas and prevents further contamination of the already dangerous atmospheric conditions that now exist.

What is claimed is:

1. A system for utilization of geothermal energy comprising:
   a geothermal well comprising a metal casing communicating between a geothermal subsurface zone and the surface of the earth, a concrete layer surrounding and engaging the exterior of the metal casing and a means for plugging the bottom of the casing;
   heat exchange means disposed near the lower extremity of said casing;
   a source of feedwater;
   pump means communicating said feedwater to said heat exchange means; and
   means for conducting heated fluid from said heat exchanger to the surface, said heat exchanger forms said means for plugging the bottom of said casing.
2. A system according to claim 1 wherein said heat exchanger contains baffles.

References Cited

UNITED STATES PATENTS

| | | | |
|---|---|---|---|
| 3,033,538 | 5/1962 | Iddles et al. | 165—107 X |
| 1,056,373 | 3/1913 | Segelken | 165—177 X |
| 1,160,853 | 11/1915 | Cook | 47—19 |
| 1,815,618 | 7/1931 | Graham | 165—78 |
| 1,967,803 | 7/1934 | Boland. | |
| 2,350,976 | 6/1944 | Worn | 165—176 |
| 2,559,253 | 7/1951 | Lingen et al. | 237—8 |
| 3,173,267 | 3/1965 | Yasuo Takeda | 60—67 |
| 3,243,359 | 3/1966 | Schmidt | 203—21 X |
| 3,274,769 | 9/1966 | Reynolds | 165—45 X |
| 3,352,107 | 11/1967 | Blaskowski | 60—64 |

FOREIGN PATENTS 257,661  4/1949  Switzerland.

CARROLL B. DORITY, Jr., Primary Examiner

U.S. Cl. X.R.

47—2, 19; 60—26; 202—180; 203—25, 88